US009973712B2

United States Patent
Ma et al.

(10) Patent No.: US 9,973,712 B2
(45) Date of Patent: May 15, 2018

(54) VIDEO IMAGE MOSAIC SYSTEM AND METHOD

(71) Applicant: BOE TECHNOLOGY GROUP CO., LTD., Beijing (CN)

(72) Inventors: Xitong Ma, Beijing (CN); Tianyue Zhao, Beijing (CN); Xiao Zhang, Beijing (CN); Lijie Zhang, Beijing (CN); Yanfu Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days. days.

(21) Appl. No.: 14/905,532

(22) PCT Filed: Aug. 12, 2015

(86) PCT No.: PCT/CN2015/086700
§ 371 (c)(1),
(2) Date: Jan. 15, 2016

(87) PCT Pub. No.: WO2016/173143
PCT Pub. Date: Nov. 3, 2016

(65) Prior Publication Data
US 2017/0111591 A1 Apr. 20, 2017

(30) Foreign Application Priority Data

Apr. 27, 2015 (CN) .......................... 2015 1 0203315

(51) Int. Cl.
*H04N 9/74* (2006.01)
*H04N 5/265* (2006.01)
*H04N 5/262* (2006.01)

(52) U.S. Cl.
CPC ........... *H04N 5/265* (2013.01); *H04N 5/2628* (2013.01)

(58) Field of Classification Search
None
See application file for complete search history.

(56) References Cited

U.S. PATENT DOCUMENTS

2006/0238647 A1* 10/2006 Lee .................. H04N 5/148
348/383
2006/0256188 A1* 11/2006 Mock ................ H04L 29/06027
348/14.09

(Continued)

FOREIGN PATENT DOCUMENTS

CN 102103826 A 6/2011
CN 202634558 U 12/2012

(Continued)

OTHER PUBLICATIONS

International Search Report and Written Opinion of the International Searching Authority for International Application No. PCT/CN2015/086700. Translation provided by Dragon Intellectual Porperty Law firm dated Sep. 30, 2015.*

(Continued)

*Primary Examiner* — Jefferey F Harold
*Assistant Examiner* — Humam Satti
(74) *Attorney, Agent, or Firm* — Harness, Dickey & Pierce, P.L.C.

(57) ABSTRACT

The present disclosure provides a video image mosaic system and a video image mosaic method. The video image mosaic system includes an image signal source, a field programmable gate array (FPGA) at least including image receivers, image scalers and image transmitters, and a Double Data Rate Synchronous Dynamic Random Access Memory (DDR). The image signal source is connected to the image receivers. The DDR is connected to the image receivers and the image scalers. The image scalers are connected to the image transmitters.

17 Claims, 2 Drawing Sheets

(56) References Cited

U.S. PATENT DOCUMENTS

| | | | |
|---|---|---|---|
| 2007/0188596 A1* | 8/2007 | Kenoyer | H04L 29/06027 |
| | | | 348/14.08 |
| 2008/0037843 A1 | 2/2008 | Fu et al. | |
| 2009/0135310 A1* | 5/2009 | Kim | G09G 3/3666 |
| | | | 348/739 |
| 2011/0197243 A1* | 8/2011 | Kuo | H04L 12/2801 |
| | | | 725/110 |
| 2013/0169755 A1* | 7/2013 | Choo | H04N 13/0497 |
| | | | 348/46 |
| 2013/0181884 A1* | 7/2013 | Perkins | H04N 9/3147 |
| | | | 345/1.3 |
| 2013/0223764 A1* | 8/2013 | Tripathi | G06T 3/4007 |
| | | | 382/298 |
| 2016/0021326 A1* | 1/2016 | Ma | G06F 3/1407 |
| | | | 348/453 |
| 2016/0328858 A1* | 11/2016 | Kimiyama | G06T 1/00 |
| 2017/0111591 A1 | 4/2017 | Ma et al. | |

FOREIGN PATENT DOCUMENTS

| | | |
|---|---|---|
| CN | 103188509 A | 7/2013 |
| CN | 103269416 A | 8/2013 |
| CN | 103473735 A | 12/2013 |
| CN | 103702060 A | 4/2014 |
| CN | 104104888 A | 10/2014 |
| CN | 104767910 A | 7/2015 |

OTHER PUBLICATIONS

First office Action regarding Chinese Application No. 20150203315.0, dated Jun. 20, 2017. Translation provided by Dragon Intellectual Poperty Law Firm dated Sep. 30, 2015.*

First Office Action regarding Chinese Application No. 201510203315.0, dated Jun. 20, 2017. Translation provided by Dragon Intellectual Property Law Firm.

International Search Report and Written Opinion of the International Searching Authority for International Application No. PCT/CN2015/086700, dated Sep. 30, 2016. Translation provided by Dragon Intellectual Property Law Firm.

* cited by examiner

VIDEO IMAGE MOSAIC SYSTEM AND METHOD

CROSS REFERENCE OF RELATED APPLICATION

This application is the U.S. national phase of PCT Application No. PCT/CN2015/086700 filed on Aug. 12, 2015, which claims a priority of the Chinese patent application No. 201510203315.0 filed on Apr. 27, 2015, the disclosure of each of which is incorporated herein by reference in their entirety.

TECHNICAL FIELD

The present disclosure relates to the field of display technology, and in particular to a video image mosaic system and a video image mosaic method.

BACKGROUND

As a hot topic in the area of video applications, video image mosaic technology may be widely used in various fields such as panoramic image generation, and application of robot with binocular vision. The image mosaic technology refers to mosaicking two or more images with an overlapping region by a video image mosaic system, so as to obtain an image with a broader vision.

In the related art, the video image mosaic system mainly includes an image signal source, a Field Programmable Gate Array (FPGA) and a Double Data Rate SDRAM (DDR). The FPGA includes an image receiver, an image scaler and an image transmitter. As illustrated in FIG. 1, the image signal source is connected to the image receiver, the image scaler is connected to both the image receiver and the DDR, and the DDR is connected to the image transmitter. For example, a process for obtaining a 6K3K mosaic image by mosaicking a 2K1K image or a 4K2K image includes: scaling the 2K1K image or the 4K2K image by the scaler to obtain a 6K3K image; segmenting the 6K3K image by the DDR to obtain multiple sub-images and transmitting the multiple sub-images to the image receiver; and outputting the multiple sub-images synchronously to mosaic the video images and obtain the 6K3K mosaic image.

The inventor finds that there is at least the following problem in the related art.

In the related art, the image scaler is connected to the image receiver, and the DDR is connected to the image transmitter; i.e., the images of different specifications are transmitted firstly through the scaler and then through the DDR. As a result, a considerably large DDR bandwidth is consumed by the scaling and segmenting steps.

SUMMARY

An object of the present disclosure is to provide a video image mosaic system and a video image mosaic method, so as to overcome the above-mentioned drawback.

In one aspect, the present disclosure provides in some embodiments a video image mosaic system, including an image signal source, a Field Programmable Gate Array (FPGA) at least including image receivers, image scalers and image transmitters, and a Double Data Rate SDRAM (DDR). The image signal source is connected to the image receivers, the DDR is connected to the image receivers and the image scalers, and the image scalers are connected to the image transmitters respectively.

Alternatively, the image receivers include a High Definition Multimedia Interface (HDMI) receiver and a Low-Voltage Differential Signaling (LVDS) receiver. When an image of a first specification is outputted by the image signal source, the image signal source is connected to the HDMI receiver, and when an image of a second specification is outputted by the image signal source, the image signal source is connected to the LVDS receiver through a System On Chip (SOC).

Alternatively, the FPGA includes image enhancement processors, which are connected to the image scalers and the image transmitters and configured to enhance sub-images.

Alternatively, the FPGA includes a selector which is connected to the image receivers and the DDR, and configured to select an image to be outputted to the DDR among images of different specifications outputted by the image signal source.

Alternatively, the number of the image scalers is equal to the number of the sub-images obtained by segmenting the image through the DDR.

Alternatively, the number of the image enhancement processors is equal to the number of the sub-images obtained by segmenting the image through the DDR.

Alternatively, the number of the image transmitters is equal to the number of the sub-images obtained by segmenting the image through the DDR.

Alternatively, the system includes a Write DDR Memory Access (WDMA) and a system bus. The WDMA is connected to the selector and the system bus, and the system bus is connected to the DDR.

Alternatively, the system includes Read DDR Memory Accesses (RDMAs). The RDMAs are connected to the image scalers and the system bus, and the system bus is connected to the DDR.

In another aspect, the present disclosure provides in some embodiments a video image mosaic method for use in the above-mentioned video image mosaic system. The method includes steps of: receiving, by one of image receivers, an image from an image signal source; segmenting, by a DDR, the image into a predetermined number of first sub-images; scaling, by image scalers, the predetermined number of the first sub-images synchronously to obtain the predetermined number of second sub-images with a specification identical to the first sub-images; and outputting, by image transmitters, the predetermined number of the second sub-images.

Alternatively, subsequent to the step of scaling, by the image scalers, the predetermined number of the first sub-images synchronously, the method further includes enhancing, by image enhancement processors, the predetermined number of the second sub-images synchronously to obtain the predetermined number of third sub-images, and outputting, by the image transmitters, the predetermined number of the third sub-images.

Alternatively, prior to the step of receiving the image by one of the image receivers, the method further includes performing, by a SOC, differential processing on an image of a second specification to obtain an image of the second specification in a LVDS format, when the image of the second specification is outputted by the image signal source.

Alternatively, the step of segmenting, by the DDR, the image into the predetermined number of the first sub-images includes segmenting, by the DDR, the image into the predetermined number of the first sub-images of an identical size.

According to the embodiments of the present disclosure, the DDR is connected to the image receivers, and the image scalers are connected to the image transmitters respectively, i.e., the images of different specifications are transmitted firstly through the DDR and then through the image scalers, so the image is firstly segmented and then scaled. As a result, as compared with the related art, it is able to reduce the DDR bandwidth consumption while ensuring the image quality.

BRIEF DESCRIPTION OF THE DRAWINGS

In order to illustrate the technical solutions of the present disclosure or the prior art in a clearer manner, the drawings desired for the embodiments will be described briefly hereinafter. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, some technical solutions of the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "a" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
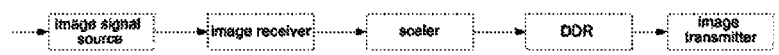
FIG. 1 is a schematic view showing an existing video image mosaic system.
Figure 2:
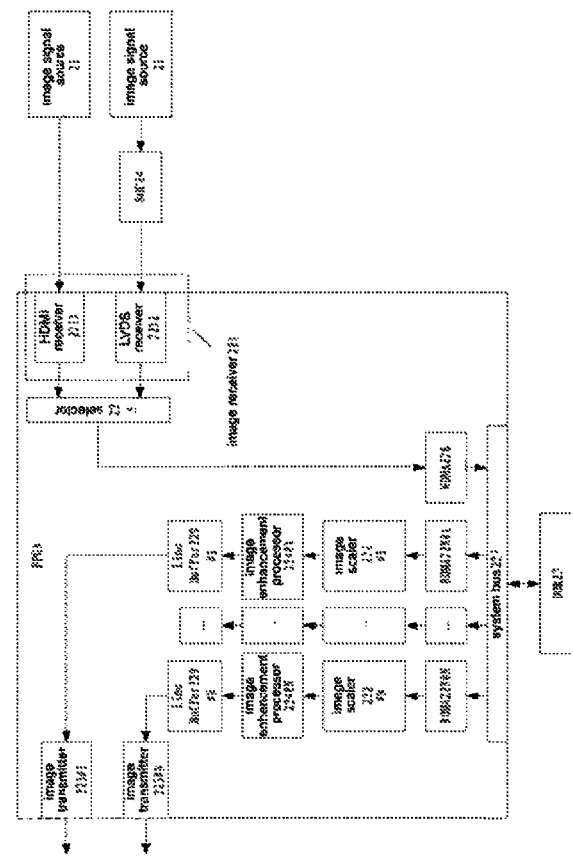
FIG. 2 is a schematic view showing a video image mosaic system according to one embodiment of the present disclosure.

Referring to FIG. 2, which is a schematic view showing a video image mosaic system according to one embodiment of the present disclosure, the video image mosaic system includes an image signal source 21, a FPGA 22 and a DDR 23. The FPGA 22 at least includes image receivers 221, image scalers 222 and image transmitters 223.

The image signal source 21 is connected to the image receivers 221, the DDR 23 is connected to the image receivers 221 and the image scalers 222, and the image scalers 222 are connected to the image transmitters 223 respectively.

In some embodiments of the present disclosure, the image signal source 21 may output video images of different specifications. For example, the image signal source 21 may output 4K2K images when the image signal source 21 includes a HDMI 1.4A signal source, and the image signal source 21 may output 2K1K images when the image signal source 21 includes a HDMI/VGA signal source. Of course, the image signal source is not particularly defined herein.

As illustrated in FIG. 2, the image receivers 221 include a HDMI receiver 2211 and a LVDS receiver 2212. When the image signal source 21 outputs an image of a first specification (for example, a 4K2K image), the image signal source 21 is connected to the HDMI receiver 2211, and when the image signal source 21 outputs an image of a second specification (for example, a 2K1K image), the image signal source 21 is connected to the LVDS receiver 2212 through a SOC 24. The SOC may perform differential processing on the image outputted by the image signal source.

Different from the related art, in the embodiments of the present disclosure, the DDR 23 is connected to the image receivers 221 and the image scalers 222, i.e. an input end of the DDR 23 is connected to output ends of the image receivers 221, and an output end of the DDR 23 is connected to input ends of the image scalers 222, so that the image is firstly segmented and then scaled. As a result, it is able to reduce the bandwidth consumption of the DDR 23.

It should be appreciated that, both the number of the image scalers 222 and the number of the image transmitters 223 are equal to the number of sub-images obtained by segmenting the image through the DDR 23. In other words, when the DDR 23 segments each video image into 3*3 (i.e., 9) sub-images, both the number of the image scalers 222 and the number of the image transmitters 223 are 9 too. Each image scaler 222 is configured to scale one of the 9 sub-images, while each image transmitter 223 is configured to output one of the 9 sub-images synchronously.

Furthermore, the DDR 23 may segment the image into the sub-images of an identical size. For example, the DDR 23 may segment a 4K2K image into 3*3 (i.e., 9) sub-images, and each of the sub-images is of a size of 4/3K2/3K. The sub-images are scaled by the image scalers 222 separately and synchronously. For example, each 4/3K2/3K sub-image is scaled into a 2K1K sub-image by the image scaler 222. Of course, a magnification factor is not particularly defined herein.

As illustrated in FIG. 2, the FPGA 22 includes the image enhancement processors 224. The image enhancement processors 224 are connected to the image scalers 222 and the image transmitters 223, and configured to enhance the sub-images.

It should be appreciated that, the number of the image enhancement processors 224 is also equal to the number of the sub-images obtained by segmenting the image through the DDR 23. In other words, when the DDR 23 segments each video image into 3*3 (i.e., 9) sub-images, the number of the image enhancement processors 224 is 9 too, and each image enhancement processor 224 is configured to enhance one of the 9 sub-images. An input end of each image enhancement processor 224 is connected to an output end of one of the image scalers, and an output end of each image enhancement processor 224 is connected to one of the image transmitters 223.

The image enhancement process aims to enhance useful information in the image. The image enhancement process may be a process of distortion, so as to improve a visual effect of the image, purposefully emphasize entire or partial characteristics of the given image in view of an application scene, convert a blurred image into a clear one or emphasize some characteristics of interest, highlight a difference between different objects in the image, and suppress the characteristics out of interest. As a result, it is able to improve the image quality, provide more information, improve interpretation and identification of the image, and satisfy the requirement of particular analyses.

As illustrated in FIG. 2, the FPGA 22 includes a selector 225, a WDMA 226, a system bus 227 and RDMAs 228. The image receivers 221 are connected to the DDR 23 through the selector 225, the WDMA 226 and the system bus 227. The WDMA 226 is connected to the selector 225 and the system bus 227, and the system bus 227 is connected to the DDR 23. The selector 225 is configured to select the image to be outputted to DDR 23 among the images of different specifications outputted by the image signal source. The RDMAs 228 are connected to the image scalers 222 and the system bus 227, and the system bus 227 is connected to the DDR 23.

The number of the RDMAs 228 is equal to the number of the sub-images obtained by segmenting the image through the DDR 23. In other words, when the DDR 23 segments each video image into 3*3 (i.e., 9) sub-images, the number of the RDMAs 228 is 9 too. The sub-image outputted by an output end of each RDMA 228 is inputted to one of the image scaler 222.

Furthermore, after being enhanced by the image enhancement processors 224, the enhanced sub-images are buffered in line buffers 229, and then transmitted to the image transmitters (HDMI TX). All of the sub-images are outputted synchronously, so as to obtain the mosaic video image. For example, for the 4K2K image, when the DDR 23 segments the 4K2K image into 9 sub-images of an identical size and the sub-image are scaled to 2K1K images synchronously, a 6K3K image may be obtained by outputting the 9 sub-images synchronously. At this time, a bandwidth of 4K2K is consumed, and as compared with the related art where a bandwidth of 6K3K is consumed, it is able to remarkably reduce the bandwidth consumption.

According to the system in the embodiments of the present disclosure, the DDR is connected to the image receivers, and the image scalers are connected to the image transmitters respectively, i.e., the images of different specifications are transmitted firstly through the DDR and then through the image scalers, so the image is firstly segmented and then scaled. As a result, as compared with the related art, it is able to reduce the DDR bandwidth consumption while ensuring the image quality.

Figure 3:
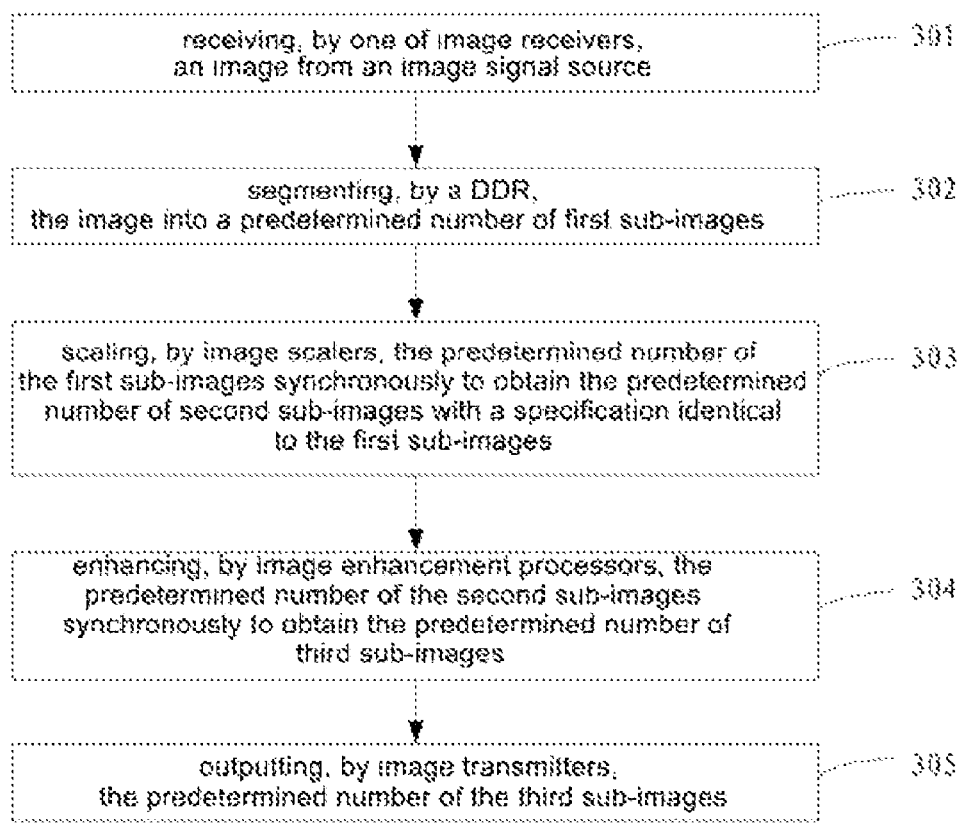
FIG. 3 is a flow chart of a video image mosaic method according to one embodiment of the present disclosure.

Referring to FIG. 3, which is a flow chart of a video image mosaic method according to one embodiment of the present disclosure, the method includes the following steps.

Step 301: receiving, by one of image receivers, an image from an image signal source.

In some embodiments of the present disclosure, prior to receiving the image by the image receiver, the method further includes performing, by a SOC, differential processing on an image of a second specification to obtain an image of the second specification in a LVDS format, when the image of the second specification is outputted by the image signal source.

Step 302: segmenting, by a DDR, the image into a predetermined number of first sub-images.

The predetermined number may be 4, 9, 16 and etc., and the number of the sub-images is not particularly defined herein.

In some embodiments, the step of segmenting, by the DDR, the image into a predetermined number of the first sub-images include segmenting, by the DDR, the image into the predetermined number of the first sub-images of an identical size.

Step 303: scaling, by image scalers, the predetermined number of the first sub-images synchronously to obtain the predetermined number of second sub-images with a specification identical to the first sub-images.

Step 304: enhancing, by image enhancement processors, the predetermined number of the second sub-images synchronously to obtain the predetermined number of third sub-images.

Step 305: outputting, by image transmitters, the predetermined number of the third sub-images.

According to the method in the embodiments of the present disclosure, the image is firstly segmented and then scaled. As a result, as compared with the related art, it is able to reduce the DDR bandwidth consumption while ensuring the image quality.

It should be appreciated that, all or a part of the steps in the above-mentioned embodiments may be implemented by hardware, or by programs which are used to instruct relevant hardware. The programs may be stored in a computer-readable storage medium, such as a Read Only Memory (ROM), a magnetic disc or an optical disc.

The above are merely the preferred embodiments of the present disclosure. A person skilled in the art may make further modifications and improvements without departing from the principle of the present disclosure, and these modifications and improvements shall also fall within the scope of the present disclosure.

What is claimed is:

1. A video image mosaic system, comprising:
   an image signal source;
   a Field Programmable Gate Array (FPGA) including:
      a selector,
      image receivers,
      image scalers, and
      image transmitters;
   a Double Data Rate Synchronous Dynamic Random Access Memory (DDR);
   a system bus;
   Read DDR Memory Accesses (RDMAs); and
   a Write DDR Memory Access (WDMA),
   wherein:
      the image signal source is connected to the image receivers,
      the DDR is connected to the image receivers and the image scalers,
      output ends of the image scalers are connected to input ends of the image transmitters respectively,
      the image scalers are connected to the image transmitters respectively,
      output ends of the image receivers are connected to input ends of the image scalers via the selector, the WDMA, the system bus, the DDR, and the RDMAs, and
      the DDR is configured to segment an image from the image signal source into a predetermined number of sub-images.

2. The system according to claim 1, wherein:
   the image receivers include a High Definition Multimedia Interface (HDMI) receiver and a Low-Voltage Differential Signaling (LVDS) receiver,
   when an image of a first specification is outputted by the image signal source, the image signal source is connected to the HDMI receiver, and
   when an image of a second specification is outputted by the image signal source, the image signal source is connected to the LVDS receiver through a System On Chip (SOC).

3. The system according to claim 1, wherein:
the FPGA includes image enhancement processors, which are connected to the image scalers and the image transmitters and
the image enhancement processors are configured to enhance the predetermined number of sub-images.

4. The system according to claim 1, wherein the selector is connected to the image receivers and the DDR, and configured to select an image to be outputted to the DDR among images of different specifications outputted by the image signal source.

5. The system according to claim 1, wherein a number of the image scalers is equal to the predetermined number of sub-images obtained by segmenting the image through the DDR.

6. The system according to claim 3, wherein a number of the image enhancement processors is equal to the predetermined number of sub-images obtained by segmenting the image through the DDR.

7. The system according to claim 1, wherein a number of the image transmitters is equal to the predetermined number of sub-images obtained by segmenting the image through the DDR.

8. The system according to claim 4, wherein:
the WDMA is connected to the selector and the system bus, and
the system bus is connected to the DDR.

9. The system according to claim 8, wherein:
the RDMAs are connected to the image scalers and the system bus, and
the system bus is connected to the DDR.

10. A video image mosaic method for the video image mosaic system according to claim 1, comprising steps of:
receiving, by one of the image receivers, the image from the image signal source;
segmenting, by the DDR, the image into a predetermined number of first sub-images;
scaling, by the image scalers, the predetermined number of first sub-images synchronously to obtain a predetermined number of second sub-images with a specification identical to the first sub-images; and
outputting, by the image transmitters, the predetermined number of second sub-images.

11. The method according to claim 10, further comprising:
subsequent to scaling the predetermined number of first sub-images, by the image scalers, enhancing, by image enhancement processors, the predetermined number of second sub-images synchronously to obtain a predetermined number of third sub-images, and
outputting, by the image transmitters, the predetermined number of third sub-images.

12. The method according to claim 10, further comprising, prior to the step of receiving the image by one of the image receivers, performing, by a SOC, differential processing on an image of a second specification to obtain an image of the second specification in a LVDS format, when the image of the second specification is outputted by the image signal source.

13. The method according to claim 10, wherein the step of segmenting, by the DDR, the image into the predetermined number of first sub-images includes segmenting, by the DDR, the image into the predetermined number of first sub-images of an identical size.

14. The system according to claim 2, wherein:
the FPGA includes image enhancement processors, which are connected to the image scalers and the image transmitters and
the image enhancement processors are configured to enhance sub-images.

15. The system according to claim 2, wherein the selector is connected to the image receivers and the DDR, and configured to select an image to be outputted to the DDR among images of different specifications outputted by the image signal source.

16. The system according to claim 3, wherein the selector is connected to the image receivers and the DDR, and configured to select an image to be outputted to the DDR among images of different specifications outputted by the image signal source.

17. The method according to claim 11, further comprising, prior to the step of receiving the image by one of the image receivers, performing, by a SOC, differential processing on an image of a second specification to obtain an image of the second specification in a LVDS format, when the image of the second specification is outputted by the image signal source.

* * * * *